United States Patent
Mori et al.

(10) Patent No.: US 8,781,038 B2
(45) Date of Patent: Jul. 15, 2014

(54) WIRELESS RECEIVING APPARATUS AND METHOD

(75) Inventors: Hiroki Mori, Kawasaki (JP); Masaki Ogata, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/599,497

(22) Filed: Aug. 30, 2012

(65) Prior Publication Data
US 2013/0064333 A1    Mar. 14, 2013

(30) Foreign Application Priority Data
Sep. 8, 2011  (JP) .................................. 2011-196548

(51) Int. Cl.
*H04L 27/06*    (2006.01)

(52) U.S. Cl.
USPC ......................................................... 375/343

(58) Field of Classification Search
USPC ......................................... 375/316, 324, 343
See application file for complete search history.

(56) References Cited

U.S. PATENT DOCUMENTS

| | | | |
|---|---|---|---|
| 6,781,446 B2 | 8/2004 | Furman et al. | |
| 8,054,920 B2 * | 11/2011 | Furman et al. | 375/344 |
| 8,059,767 B2 * | 11/2011 | Furman et al. | 375/344 |
| 8,311,488 B2 * | 11/2012 | Furman et al. | 455/69 |

* cited by examiner

*Primary Examiner* — Jaison Joseph
(74) *Attorney, Agent, or Firm* — Holtz Holtz Goodman & Chick PC

(57) ABSTRACT

According to one embodiment, a wireless receiving apparatus includes a calculation module, a first determination module and a second determination module. The second determination module determines a length of interleaver blocks by determining whether or not a maximum value of second correlation value sequence is not less than a second threshold value within a first period, the second correlation value sequence being generated by combining third correlation values being between the receiving signal and each of reference signals, and to determine an initial position of the interleaver blocks based on a position of the maximum value.

20 Claims, 4 Drawing Sheets

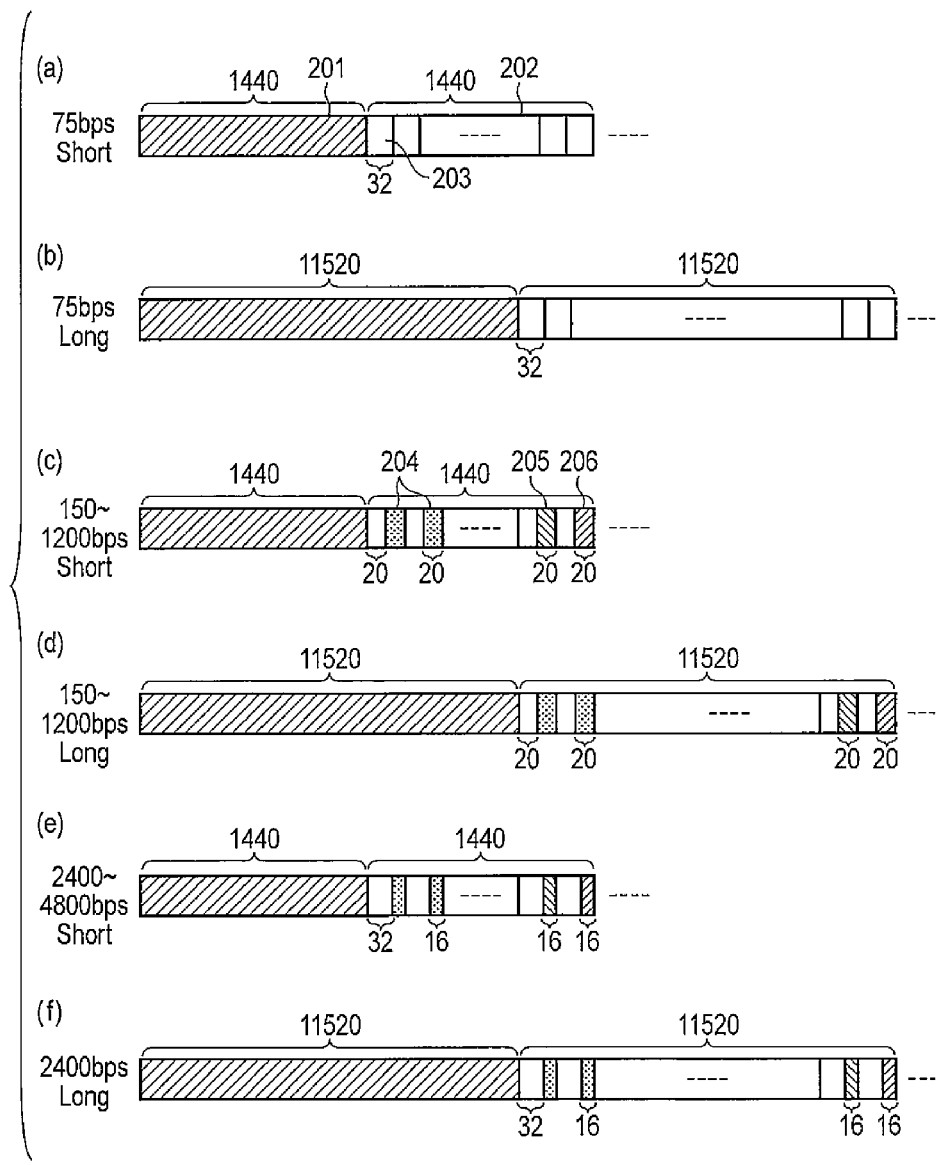
F I G. 2

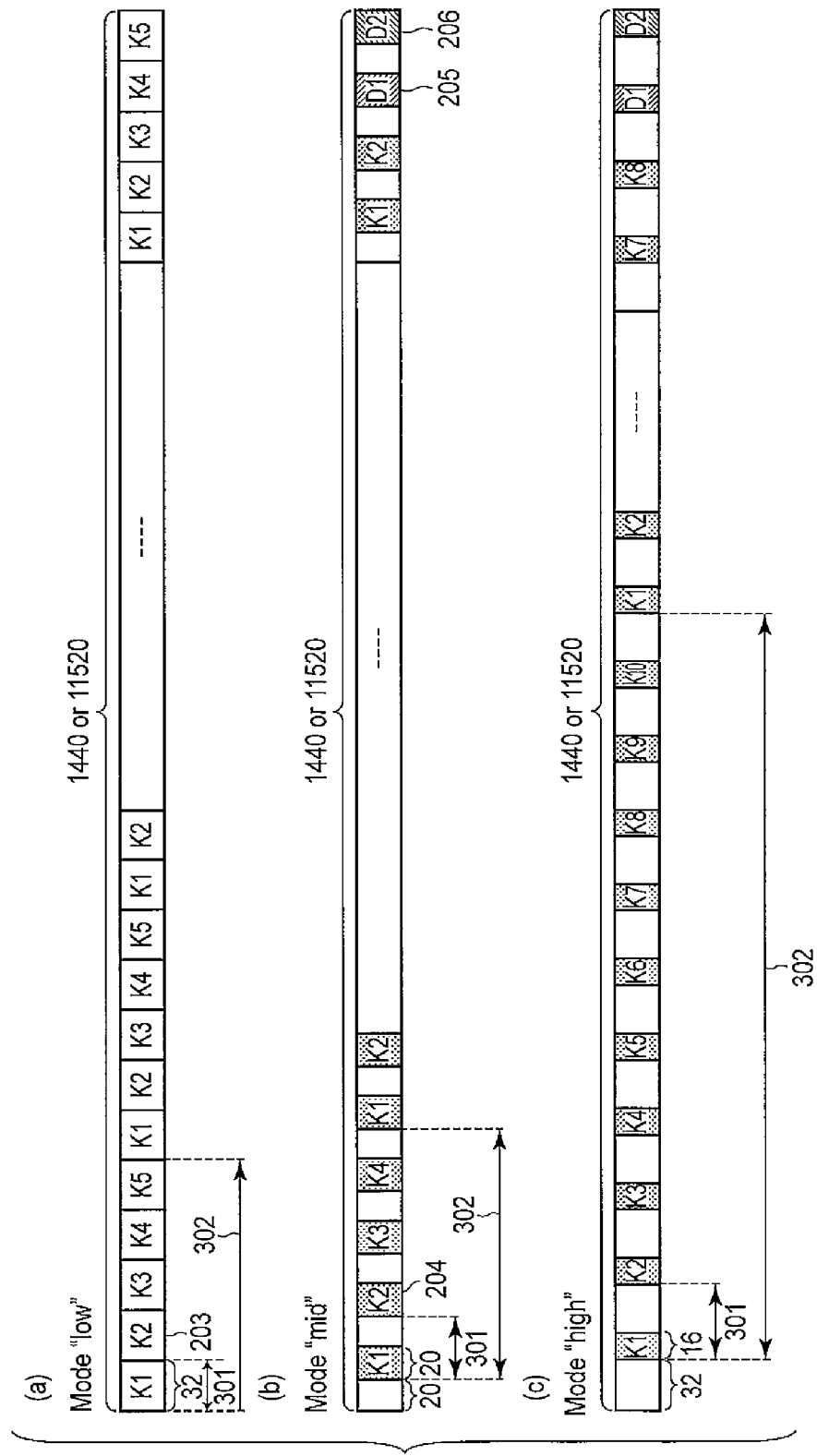
F I G. 3

| Data rate [bps] | Interleaver length | | | |
|---|---|---|---|---|
| | Short | | Long | |
| | D1 | D2 | D1 | D2 |
| 75 | 7 | 5 | 5 | 5 |
| 150 | 7 | 4 | 5 | 4 |
| 300 | 6 | 7 | 4 | 7 |
| 600 | 6 | 6 | 4 | 6 |
| 1200 | 6 | 5 | 4 | 5 |
| 2400 (For data) | 6 | 4 | 4 | 4 |
| 2400 (For audio) | 7 | 7 | — | — |
| 4800 | 7 | 6 | — | — |
F I G. 4
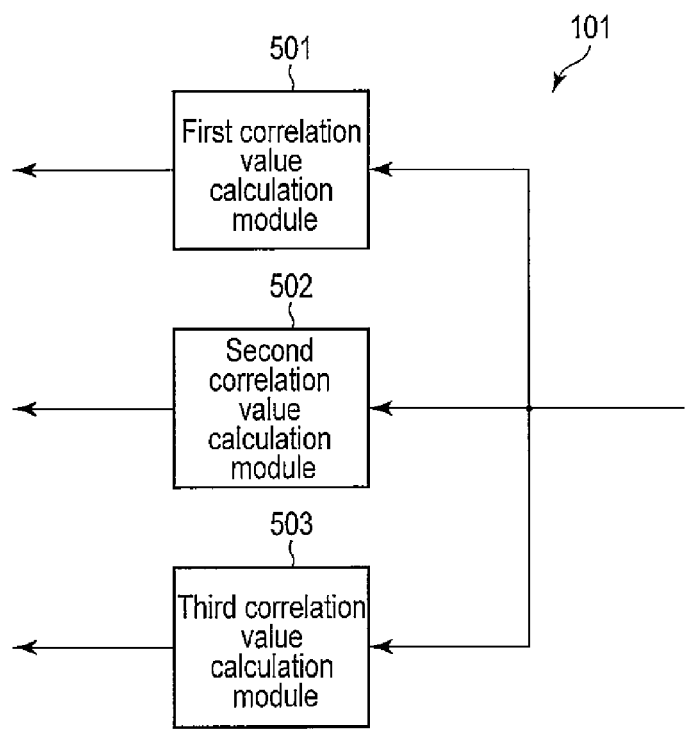
F I G. 5

WIRELESS RECEIVING APPARATUS AND METHOD

CROSS-REFERENCE TO RELATED APPLICATIONS

This application is based upon and claims the benefit of priority from Japanese Patent Application No. 2011-196548, filed Sep. 8, 2011, the entire contents of which are incorporated herein by reference.

FIELD

Embodiments described herein relate generally to a wireless receiving apparatus and method.

BACKGROUND

A conventional receiving apparatus receives a preamble signal at the beginning of a frame and decodes a control signal included in the preamble signal. Thereby, parameters such as interleaver size applied in a data portion following a preamble portion can be obtained, and a data signal can be decoded appropriately.

BRIEF DESCRIPTION OF THE DRAWINGS

FIG. 2 is a diagram of the frame configuration in the MIL standard;
FIG. 3 is a diagram showing the arrangements of known signals in data frames in the MIL standard;
FIG. 4 is a table showing the relations among the data rates, interleaver lengths, and sequences in the MIL standard;
FIG. 5 is a block diagram of a correlation value calculation module.

DETAILED DESCRIPTION

Figure 1:
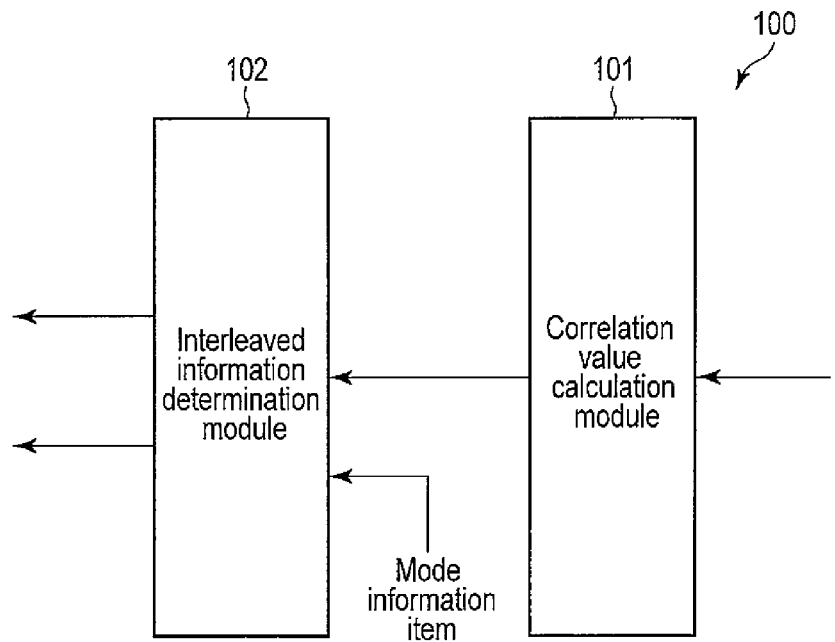
FIG. 1 is a block diagram of a wireless receiving apparatus.

Depending on the wireless receiving apparatus, receiving does not always start from the beginning of a frame but may start without a preamble signal. In this case, if the initial position of interleaver block or the size of interleaver block cannot be obtained, it may be difficult to perform a demodulation process appropriately. For example, in the case of receiving without preamble signal, a method for identifying the mode configuration of a frame may be used. However, this method cannot determine an interleaver block start position or the size of interleaver block. Accordingly, the method fails to appropriately demodulate data signals contained in a frame.

In general, according to one embodiment, a receiving apparatus includes a calculation module, a first determination module and a second determination module. The calculation module is configured to calculate one or more first correlation values between a received signal and one or more reference signals, the reference signals corresponding to one or more first sequences which have a possibility of being used for known signals inserted in a frame of the receiving signal. The first determination module is configured to determine a reference position of a first known signal in the frame based on a second correlation value that is not less than a first threshold value, the first known signal being one of the known signals, the second correlation value being included in a first correlation value sequence, the first correlation value sequence being generated by combining the first correlation values according to a mode based on data rate of the receiving signal. The second determination module is configured to determine the length of interleaver blocks by determining whether or not the maximum value of second correlation value sequence is not less than a second threshold value within a first period, the interleaver blocks being a unit for an interleaver process performed for the frame, the second correlation value sequence being generated by combining third correlation values, the third correlation values being between the receiving signal and each of reference signals which correspond to a plurality of second sequences used for a second known signal located at the trailing end of the interleaver blocks and being extracted at the timing of possibly being a second known signal according to the reference position, and to determine an initial position of the interleaver blocks based on the position of the maximum value.

A wireless receiving apparatus and method according to one embodiment of the present disclosure will be described in detail below with reference to the drawings. In the description below, parts labeled with the same reference sign perform the same operations, and duplicate explanations are omitted.

The description of the present embodiment is given following MILITARY(MIL)-STANDARDS(STD)-188-110b (hereafter referred to as MIL standards). However, the present embodiment is not limited to the receiving of frames defined by the MIL standards but may receive frames defined by other radio communication standards, such as communication standards defined by the Standardization Agreement (STANAG standards) or standards defined by modifying the MIL standards or STANAG standards.

Referring to the block diagram in FIG. 1, a radio receiving apparatus 100 according to the present embodiment will now be described.

The radio receiving apparatus 100 includes a correlation value calculation module 101 and an interleaver information determination module 102.

The correlation value calculation module 101 receives a signal from an external communicating module (not shown) including an antenna, etc., and calculates correlation values between the receiving signal and one or more reference signals corresponding to one or more sequences. The present embodiment uses the Walsh-Hadamard sequence with code length of 32.

The interleaver information determination module 102 receives the mode information item for receiving signals from outside, and a plurality of correlation values from the correlation value calculation module 101, and calculates the initial position of an interleaver block and the size of this interleaver block. The mode information item indicates the type of data frame according to the standards, which is determined by the data rate of a receiving signal. In the present embodiment, mode information item indicates information indicating the mode type of a receiving signal, which is selected from among three modes: low, middle, and high. A known signal interval and a known signal frequency are determined according to mode type. Hence, mode type indicates a known signal interval and a known signal frequency. The known signal interval indicates an interval between adjacent known signals in a frame of the received signal. The known signal period indicates a period required for the same known signal to reappear in the frame. The known signal interval and known signal period are described below with reference to FIG. 3.

An interleaver block indicates a block of a size determined by interleaver length.

Referring then to FIG. 2, a description will be given of frame structures corresponding to the MIL standards and employed in the embodiment. (a) to (f) of FIG. 2 show all patterns of frames that have structures corresponding to the MIL standards and serve as reception targets of the wireless receiving apparatus 100.

The MIL standards support 8 data rates, such as 75 bit per second (bps), 150 bps, 300 bps, 600 bps, 1200 bps, 2400 bps (for audio), 2400 bps (for data), and 4800 bps. The MIL standards also support two interleaver lengths (Short and Long). Different data rates and interleaver lengths make different frame structures. For convenience sake, an interleaver having a short interleaver length will be referred to as a "short interleaver," and an interleaver having a long interleaver length will be referred to as a "long interleaver."

Each frame structure includes a preamble signal portion 201 as a leading portion, and a data signal portion 202 subsequent thereto. The data signal portion 202 at least includes data blocks 203, and also includes, depending upon the data rate, training blocks (also referred to as known signals) 204, a control signal D1 205 and a control signal D2 206.

The preamble signal portion 201 as the leading portion of the frame is varied in length in accordance with the interleaver length applied. In the case of the short interleaver, the preamble signal portion 201 has a length of 1440 symbols (corresponding to 0.6 seconds), while in the case of the long interleaver, it has a length of 11520 symbols (corresponding to 4.8 seconds).

The data signal portion 202 is demodulated per block size, and the block size is determined from the interleaver length applied. In the case of the short interleaver, the block size is 1440 symbols (corresponding to 0.06 seconds), while in the case of the long interleaver, it is 11520 symbols (corresponding to 4.8 seconds).

As shown in (a) to (f) of FIG. 2, the interleaver block structure of the data signal portion 202 is varied in accordance with the data rate and the interleaver length.

(a) and (b) of FIG. 2 show the cases where the data rate is set to 75 bps, (a) indicating a short interleaver case, and (b) indicating a long interleaver case. The frames shown in (a) and (b) of FIG. 2 are each formed of the data blocks 203 only, and have no training blocks 204. One of the four sequences is assigned to the data blocks 203 in units of 32 symbols. Accordingly, in the short interleaver shown in (a) of FIG. 2, the interleaver block includes 45 data blocks 203, while in the long interleaver shown in (b) of FIG. 2, the interleaver block includes 360 data blocks 203.

(c) and (d) of FIG. 2 show the cases where the data rate is set to a value within the range of 150 bps to 1200 bps, (c) indicating a short interleaver case, and (d) indicating a long interleaver case. In each of the frames shown in (c) and (d) of FIG. 2, data blocks 203 each formed of 20 symbols and training blocks 204 each formed of 20 symbols are alternately arranged. Further, the last two training blocks 204 in the interleaver block are formed of the control signal D1 205 and the control signal D2 206, respectively. Accordingly, in the short interleaver (c), 36 data blocks 203 and 36 training blocks 204 are included in the interleaver block, and the $35^{th}$ and $36^{th}$ training blocks 204 are formed of the control signal D1 205 and the control signal D2 206, respectively. Similarly, in the long interleaver (d), 288 data blocks 203 and 288 training blocks 204 are included in the interleaver block, and the $287^{th}$ and $288^{th}$ training blocks 204 are formed of the control signal D1 205 and the control signal D2 206, respectively.

(e) and (f) of FIG. 2 show the cases where the data rate is set to a value within a range of 2400 bps to 4800 bps, (e) indicating a short interleaver case, and (f) indicating a long interleaver case. In each of the frames shown in (e) and (f) of FIG. 2, data blocks 203 each formed of 32 symbols and training blocks 204 each formed of 16 symbols are alternately arranged. Further, the last two training blocks 204 in the interleaver block are formed of the control signal D1 205 and the control signal D2 206. Accordingly, in the short interleaver (e), 30 data blocks 203 and 30 training blocks 204 are included in the interleaver block, and the $29^{th}$ and $30^{th}$ training blocks 204 are formed of the control signal D1 205 and the control signal D2 206, respectively. Similarly, in the long interleaver (f), 240 data blocks 203 and 240 training blocks 204 are included in the interleaver block, and the $239^{th}$ and $240^{th}$ training blocks 204 are formed of the control signal D1 205 and the control signal D2 206, respectively.

In light of the combination of the data blocks 203 and the training blocks 204 in the interleaver block, the data signal portion 202 can be roughly classified into the three modes, i.e., 75 bps, 150 bps to 1200 bps, and 2400 bps to 4800 bps. In the descriptions below, for convenience sake, the frame of 75 bps will be referred to as a mode "low," the frame of 150 bps to 1200 bps will be referred to as a mode "mid," and the frame of 2400 bps to 4800 bps will be referred to as a mode "high."

Referring then to FIG. 3, a description will be given of the known signals in the interleaver block of the data signal portion in each mode.

In the mode "low," the interleaver block of the data signal portion includes only data blocks. However, since each of the data blocks includes one of the prepared sequences, it is substantially regarded as a known signal. Accordingly, in FIG. 3, a data block K1 includes one of four sequences (sequences 1 to 4) with a code length of 32 symbols, and a data block K2 includes one of four sequences (sequences 5 to 8) with a code length of 32 symbols. Similarly, a data block K3 includes one of sequences 9 to 12, a data block K4 includes one of sequences 13 to 16, and a data block K5 includes one of sequences 17 to 20.

A data block K5' as the last block of the interleaves block includes one of four sequences (sequences 21 to 24) with a code length of 32 symbols, which differ from the four sequences of the data block K5. The one sequence included in each data block is selected from the corresponding four sequences, and is multiplied by two-bit data included in and to be transmitted by the each data block.

From the above, in the mode "low," the total number of known signals is 24 (=four sequences×5 blocks (K1 to K5)+ four sequences×1 block (K5')), the known signal length is 32 symbols, the known signal interval is 32 symbols, and the known signal period (except for the control signals) is 160 symbols. For instance, in the example of FIG. 3, in the mode "low," a known signal interval 301 is the interval between leading end of the data block K1 and that of the data block K2. A known signal period 302 is the period required for a subsequent data block K1 to appear after a preceding data block K1 appears.

In the mode "mid," a training block K1 in FIG. 3 is formed of a sequence 1 with a code length of 20 symbols, and a training block K2 is formed of a sequence 2 with a code length of 20 symbols. Similarly, a training block K3 is formed of a sequence 3, and a training block K4 is formed of a sequence 4. The control signal D1 in the interleaver block is formed of one of four sequences (sequences D1_4 to D1_7) with a code length of 20 symbols. The control signal D2 is formed of one of four sequences (sequences D2_4 to D2_7) with a code length of 20 symbols.

From the above, in the mode "mid," the total number of known signals is 12 (=1×4 blocks (K1 to K4)+4×2 blocks (D1 and D2), and the known signal length is 20 symbols, the known signal interval is 40 symbols, and the known signal period (excluding the control signals) is 160 symbols.

In the mode "high," the training block K1 in FIG. 3 is formed of a sequence 1 with a code length of 16 symbols, and the training block K2 is formed of a sequence 2 with a code length of 16 symbols. Similarly, the training block K3 is formed of a sequence 3, the training block K4 is formed of a sequence 4, the training block K5 is formed of a sequence 5, a training block K6 is formed of a sequence 6, a training block K7 is formed of a sequence 7, a training block K8 is formed of a sequence 8, a training block K9 is formed of a sequence 9, and a training block K10 is formed of a sequence 10. The control signal D1 in the interleaver block is formed of one of four sequences (sequences D1_4 to D1_7) each having a code length of 16 symbols. The control signal D2 is formed of one of four sequences (sequences D2_4 to D2_7) each having a code length of 16 symbols.

From the above, in the mode "high," the total number of known signals is 18 (=1×10 blocks (K1 to K10)+4×2 blocks (D1 and D2), and the known signal length is 16 symbols, the known signal interval is 48 symbols, and the known signal period (excluding the control signals) is 480 symbols.

Referring then to the table of FIG. 4, a description will be given of the relationship between the sequences applied to the control signals, the data rate and the interleaver length.

The sequences providing the control signals D1 and D2 are determined from the data rate and interleaver length applied to the frame. As shown in FIG. 4, in the case of, for example, the mode "mid," i.e., in the case where the data rate is 1200 bps and the interleaver length is "Long," the sequence D1_4 is applied to the control signal D1, and the sequence D2_5 is applied to the control signal D2. Similarly, in the mode "high," i.e., in the case where the data rate is 2400 bps and the interleaver length is "Short," the control signal D1 is formed of the sequence D16, and the control signal D2 is formed of the sequence D24.

It should be noted that in the MIL standards, in the mode "mid," the former 16 symbols included in each of the four sequences (D1_4 to D1_7) having a length of 20 symbols assume different values, and the latter 4 symbols assume the common value. The same can be said of the four sequences (D2_4 to D2_7) having a length of 20 symbols and used for the control signal D2.

A correlation calculation module 101 according to the present embodiment will be described with reference to the block diagram in FIG. 5.

The correlation value calculation module 101 includes a first correlation value calculation module 501, second correlation value calculation module 502, and third correlation value calculation module 503. The first correlation value calculation module 501 calculates a correlation value for a receiving signal according to the data rate used for mode "low". For example, a correlation value is calculated by providing each sequence with a correlator (not shown) for mode "low" and performing a process of correlation between the reference signal and receiving signal based on the known signals of each sequence.

The second correlation calculation module 502 calculates a correlation value according to the data rate used for mode "mid".

The third correlation calculation module 503 calculates a correlation value according to the data rate used for mode "high". FIG. 5 shows an example where receiving signals are transmitted to the respective correlators of the sequences according to the corresponding frame modes, and correlation values are calculated in parallel. However, the embodiment is not limited by this, but a single correlator may calculate correlation values for the whole sequence by sequentially changing reference signals corresponding to the sequences.

A correlation process performed by the correlation value calculation module 101 will be described.

In the present embodiment, a description is given using a method for calculating a correlation value based on cross correlation that uses a known signal as a reference signal. However, the embodiment is not limited by this, for any method will suffice as long as a correlation value can be calculated. A correlation value may also be calculated by autocorrelation. However, in the case of mode "low", since a known signal is determined according to data, it is necessary to note that the periodicity of a known signal is not confirmed. For instance, where the sequence 1 is used for the first data block K1, the sequence 1 need not always be used for the next data block K1.

In mode U ($\in$ {low, mid, and high}), a reference signal using as a reference the known signal of the sequences X is represented by $r_{U, X}$. For example, a reference signal based on a sequences 21 in mode "low" is represented by $r_{low, 21}$, and a reference signal based on the sequences D2_6 in mode "high" is represented by $r_{high, D2\_6}$.

The first correlation value calculation module 501 includes a correlator that has reference signals $r_{low, 1}$ to $r_{low, 24}$, the second correlation value calculation module 502 includes a correlator that has reference signals $r_{mid, 1}$ to $r_{mid, 4}$, $r_{mid, D1\_4}$ to $r_{mid, D1\_7}$, and $r_{mid, D2\_4}$ to $r_{mid, D2\_7}$, and the third correlation value calculation module 503 includes a correlator that has reference signals $r_{high, 1}$ to $r_{high, 10}$, $r_{high, D1\_4}$ to $r_{high, D1\_7}$, and $r_{high, D2\_4}$, to $r_{high, D2\_7}$.

Here, a receiving signal y(t) of the $t^{th}$ symbol is given by equation (1).

$$y(t) = \sum_{l=1}^{L} h_l(t) s(t - \tau_l) + \eta(t) \quad (1)$$

In the equation, s represents a transmission signal, $h_l$ represents the channel of the $l^{th}$ (l is a positive integer) path, $\tau_l$ represents a delay time of the $l^{th}$ path, L is the number of paths, and $\eta$ represents noise. The first, second, and third correlation calculation modules 501, 502, and 503 calculate the correlation values of the reference signals with the receiving signal. Correlation value $Z'_{U, X}(t)$ of the correlator using a reference signal $r_{U, X}$ in mode U is given by equation (2).

$$Z'_{U,X}(t) = \frac{\left| \sum_{t'=0}^{T_U-1} r^*_{u,X}(t') y(t+t') \right|}{\sqrt{\sum_{t'=0}^{T_U-1} r^*_{u,X}(t') r_{u,X}(t')} \sqrt{\sum_{t'=0}^{T_U-1} y^*(t+t') y(t+t')}} \quad (2)$$

In the equation, $T_U$ represents the length of a reference signal (the length of a known signal) in mode U. A superscript * indicates a complex conjugate. For example, $r_{U, X^*}$ in Equation (2) represents the complex conjugate of $r_{U,X}$. The denominator in Equation (2) is a normalization term for converting a correlation value into a scale from zero to 1 but does not have to be taken into account.

Figure 6:
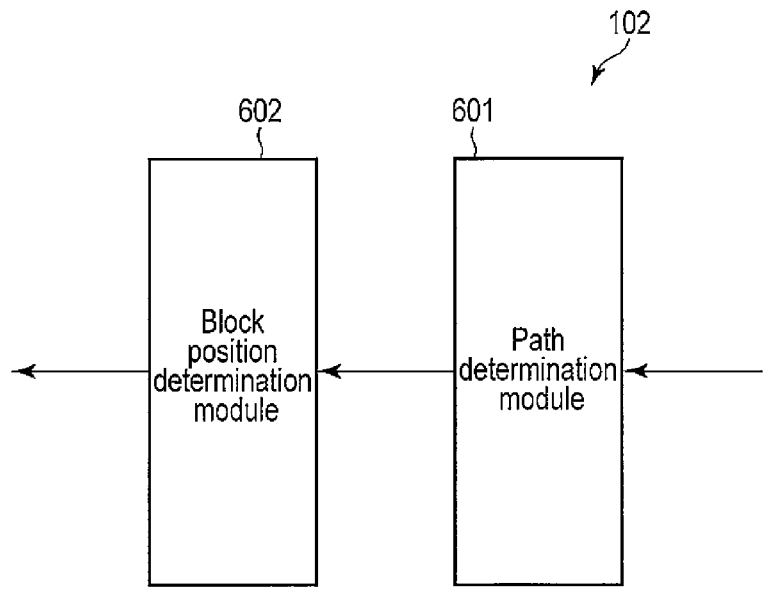
FIG. 6 is a block diagram of an interleaver information determination module.

Next, the interleaver information determination module 102 according to the present embodiment will be described with reference to the block diagram in FIG. 6.

The interleaver information determination module 102 includes a path determination module 601 and a block position determination module 602.

The path determination module 601 receives mode information item from outside and correlation values from the correlation value calculation module 101, and combines the correlation values based on a known signal period and known signal interval, thereby obtaining a correlation value sequences. Using as a reference the point that has the maximum value in the correlation value sequences, the path determination module 601 compares a threshold value and correlation values in sample positions before and after the reference by the number of sample positions corresponding to an assumed delay time, and determines that the points for correlation values that not less than the threshold value are path positions. Thereafter, the determination module 601 determines, as a reference position, a sample position corresponding to the path position of the receiving signal closest to the position at which signal receiving has started (also referred to as a receiving start position) among the points determined as path positions.

In the present embodiment, since correlation values are combined on the time axis of a training block K1, the reference position of training block K1 that appears for the first time after the position at which frame receiving has started is determined.

The block position determination module 602 receives, from the path determination module 601, the mode information item and a correlation value sequences determined as a reference position. Based on the mode information item (the mode type), the block position determination module 602 estimates the initial position of the trailing end block among interleaver blocks from the position of the reference block. Subsequently, the block position determination module 602 extracts the maximum of the correlation values from the sequences corresponding to the trailing-end block, and combines the correlation values every fixed period. If the value obtained by combining correlation values is not less than a threshold value, a determination is made that the interleaver length corresponds to short interleaver, and the initial position of the training end block is determined. If the value obtained by combining correlation values is less than the threshold value, the determination is made that the interleaver length corresponds to long interleaver, and the initial position of the trailing end block of the interleaver blocks is determined.

This process is not necessarily performed using, as a reference, the time axis of a correlation value sequences obtained by the reference signal of training block K1, but may be performed using a reference signal of any block as a reference. For example, if determination of the initial position of a training block K3 that appears for the first time after the position at which frame receiving has started is required, the same process as above may be performed using as a reference the time axis of the sequences of correlation values obtained by the reference signal of training block K3.

A determination process performed by the interleaver information determination module 102 will now be described.

First, the operation of the path determination module 601 will be described in detail. Using correlation value sequences $Z_{U',m}(t)$ of each mode U' calculated by the method described above, the initial position $P_{U'}$ of training block K1 that appears for the first time after the position at which frame receiving has started is determined as a reference position.

Here, a description is given of correlation values $Z'_{low,1}$ to $Z'_{low,24}$ calculated by the first correlation value calculation module 501 when a receiving signal is transmitted in mode "low". A data block K1 is composed of using one of sequences 1 to 4. Therefore, at the time of processing data block K1, it is assumed that a high correlation value is indicated by one of the four correlators that have reference signals $r_{low,1}$ to $r_{low,4}$. Similarly, at the time of processing a data block K4, it is assumed that a high correlation value is indicated by one of the four correlators that have reference signals $r_{low,13}$ to $r_{low,16}$. Thus, the correlation value that is maximum at each time t in the group of correlators can be determined as the time of processing a required data block.

Therefore, when a correlation value is selectively output from the group of correlators, the number of correlation value sequences $M_{low}$ is five in mode "low". If the $m^{th}$ (m=1, 2, ... , 5) correlation value sequences is represented by $Z_{low,m}$, $Z_{low,m}$ is given by equation (3).

$$Z_{low,m}(t)=\max(Z'_{low,4(m-1)+1}(t),Z'_{low,4(m-1)+2}(t),\ldots,Z'_{low,4m}(t)), m=1,2,\ldots,5 \quad (3)$$

With regard to the fifth correlation value sequences $Z_{low,5}$, taking last data block K5' of the interleaver bocks into account, the correlation value that is maximum at each time t may be selected from a group of eight correlators that have reference signals $r_{low,17}$ to $r_{low,24}$. In this case, the $m^{th}$ (m=1 to 5) correlation value sequences $Z_{low,m}$ is given by equation (4).

$$Z_{low,m}(t) = \begin{cases} \max(Z'_{low,4(m-1)+1}(t), Z'_{low,4(m-1)+2}(t), \ldots, Z'_{low,4m}(t)), & m = 1, 2, 3, 4 \\ \max\begin{pmatrix} Z'_{low,4(m-1)+1}(t), \\ Z'_{low,4(m-1)+2}(t), \ldots, Z'_{low,4(m+1)}(t) \end{pmatrix} & m = 5 \end{cases} \quad (4)$$

In contrast, where a receiving signal is transmitted in mode "mid", the number of known signals used for each training block is one. Therefore, correlation values $Z'_{mid,1}$ to $Z'_{mid,4}$ calculated by the second correlation value calculation module 502 may be used as a correlation value sequences as they are. Therefore, in mode "mid", the number of correlation value sequences $M_{mid}$ is four and, if the $m^{th}$ correlation value sequence is represented by $Z_{mid,m}$, $Z_{mid,m}$ is given by equation (5).

$$Z_{mid,m}(t)=Z'_{mid,m}(t), m=1,2,\ldots,4 \quad (5)$$

With regard to the third correlation value sequences $Z_{mid,3}$, taking a control signal block D1 into account as well, the correlation value that is maximum at each time symbol t may be selected from a group of five correlators that have reference signals $r_{mid,3}$ and $r_{mid,D1\_4}$ to $r_{mid,D1\_7}$. Additionally, with regard to the fourth correlation value sequences $Z_{mid,4}$, taking a control signal block D2 into account as well, a correlation value that is maximum at each time symbol t may be selected from a group of five correlators that have reference signals $r_{mid,4}$ and $r_{mid,D2\_4}$ to $r_{mid,D2\_7}$. In this case, the $m^{th}$ (m=1 to 4) correlation value sequences $Z_{mid,m}$ is given by equation (6).

$$Z_{mid,m}(t) = \begin{cases} Z'_{mid,m}(t), & m = 1, 2 \\ \max(Z'_{mid,m}(t), Z'_{mid,D1\_4}(t), \ldots, Z'_{mid,D1\_7}(t)), & m = 3 \\ \max(Z'_{mid,m}(t), Z'_{mid,D2\_4}(t), \ldots, Z'_{mid,D2\_7}(t)), & m = 4 \end{cases} \quad (6)$$

In contrast, where a receiving signal is transmitted in mode "high", the number of known signals used for each training block is one. Therefore, correlation values $Z'_{high,1}$ to $Z_{high,10}$ calculated by the third correlation value calculation module 503 may be used as a correlation value sequences as they are. Therefore, in mode "high", the number of correlation value sequences $M_{high}$ is ten and, if the $m^{th}$ correlation value sequence is represented by $Z_{high, m}$ $Z_{high, m}$ is given by equation (7).

$$Z_{high,m}(t)=Z'_{high,m}(t), m=1,2,\ldots,10 \qquad (7)$$

With regard to the ninth correlation value sequences $Z_{high, 9}$, taking a control signal block D1 into account as well, the correlation value that is maximum at each time symbol t may be selected from a group of five correlators that have reference signals $r_{high, 9}$ and $r_{high, D1\_4}$ to $r_{high, D1\_7}$. Additionally, with regard to the tenth correlation value sequences $Z_{high, 10}$, taking a control signal block D2 into account as well, a correlation value that is maximum at each time symbol t may be selected from a group of five correlators that have reference signals $r_{high, 10}$ and $r_{high, D2\_4}$ to $r_{high, D2\_7}$. In this case, the $m^{th}$ (m=1 to 10) correlation value sequences $Z_{high, m}$ is given by equation (8).

$$Z_{high,m}(t) = \begin{cases} Z'_{high,m}(t), & m=1,2,\ldots,8 \\ \max(Z'_{high,m}(t), Z'_{high,D1\_4}(t), \ldots, Z'_{high,D1\_7}(t)), & m=9 \\ \max(Z'_{high,m}(t), Z'_{high,D2\_4}(t), \ldots, Z'_{high,D2\_7}(t)), & m=10 \end{cases} \qquad (8)$$

In the foregoing example, the correlators are grouped by the path determination module 601. However, the correlation value calculation module 101 may group the correlators. For instance, a selecting module (not shown) may group correlators corresponding to the sequences used in a data block in mode "low" and control signal blocks in mode "middle" and mode "high". Thereafter, the selecting module may select the correlator that outputs the maximum correlation value among the grouped correlators, and may output this correlation value to the interleaver information determination module 102.

Next, in order to cope robustly with noise and fading, a process of combining correlation value sequences is performed using the characteristics of a known signal interval or known signal period.

According to a known signal interval, the first correlation value sequences in mode U' to $M_{U'}^{th}$ correlation value sequences are combined. If the correlation value as a result of combining the correlation value sequences in mode U' is represented by $C'_{U'}$, $C'_{U'}$ is given by equation (9).

$$C'_{u'}(t) = \frac{1}{M_{u'}} \sum_{m=1}^{M_{u'}} Z_{u',m}(t + \tau_{u'}^{RI}(m-1)) \qquad (9)$$

In the equation, $\tau_{U'}^{RI}$ represents a reference signal interval (Reference Interval: RI) in mode U'.

Next, for correlation value $C'_{U'}$ given by combining the correlation value sequences, combining in the direction of time is carried out only for the period of a target section length N, by using a reference signal cycle (Reference Cycle: RC) as a unit. The target section length N is preferably set as given by equation (10).

$$N=K_u \times \tau_u^{RC} \qquad (10)$$

In the equation, $\tau_u^{RC}$ represents a reference signal cycle in mode U'. If a correlation value given by the combining process in the direction of time in mode U' is represented by $C_{U'}$, $C_{U'}$ is given by equation (11).

$$C_{u'}(p) = \frac{1}{K_{u'}} \sum_{k=1}^{K_{u'}} C'_{u'}(p + \tau_{u'}^{RC}(k-1)), \qquad (11)$$

$$p = 1, 2, \ldots, \tau_{u'}^{RC}$$

In the equation, p represents a sample index given by the combining process.

The point that has the maximum of correlation value $C_{U'}(p)$ after combining in the direction of correlation value sequences and the direction of time is carried out in the manner described above is used as a temporary initial position $P'_{U'}$ of a training block K1 that appears for the first time after the position at which frame receiving has started. The temporary initial position $P'_{U'}$ is given by equation (12).

$$p'_{u'} = \underset{p}{\operatorname{argmax}}(C_{u'}(p)) \qquad (12)$$

The path determination module 601 calculates the temporary initial position $P'_{U'}$ as described above. However, depending on propagation path environment, a path may be composed of a direct wave only as in Additive White Gaussian Noise (AWGN) or may be composed of an advance wave and a plurality of delay waves as in a multipath. In the case of a multipath, there may be a possibility that the position deviated by an amount corresponding to the delay time $\tau_l$ of the $l^{th}$ path from the initial position of a training block K1 that appears for the first time after the position at which frame receiving has started may be determined as a temporary initial position $P'_{U'}$.

To avoid this, the process of determining the advance wave position of a channel is performed based on the temporary initial position $P'_{U'}$. The advance wave position obtained by this determining process is determined as an initial position $P_{U'}$ for a training block K1 that appears for the first time after the position at which frame receiving has started.

In the process of determining an advance wave position, the determination is not made for a correlation value $C_{U'}(p)$ obtained by combining correlation values $C'_{U'}(t)$ in the direction of time within a target section length N as given by equation (11), but is made for a correlation value $C_{U'}^g(p)$ obtained by dividing the target section length N into a plurality of search section lengths $T_{SCH}$ and combining in the direction of time within each search section length $T_{SCH}$ by using reference signal cycle $\tau_{u'}^{RC}$ as a unit.

The reason why the correlation value is found for each search section length $T_{SCH}$ is that combining correlation values $C'_{U'}(t)$ by use of the entire target section length N yields a low correlation value if a deep fading is included, making it impossible to appropriately detect an advance wave position.

A search section length $T_{SCH}$ is set so as to satisfy equations (13) and (14).

$$T_{SCH}=\tau_u^{RC} \times K'_{u'} \qquad (13)$$

$$N=T_{SCH} \times G \qquad (14)$$

In the equation, $K'_{u'}$ is an integer of 1 or greater, and is a combining number used when combining is carried out in the direction of time within each search section length $T_{SCH}$ in mode U' by having a reference signal cycle $\tau_{u'}^{RC}$ as a unit. G is an integer of 1 or greater and is the number of partitions where the target section length N is divided by a search section length $T_{SCH}$.

A correlation value $C_u^g(p)$ as a result of combining within the $g^{th}$ one of the search sections into which the target section length N is divided is expressed by equation (15).

$$C_{u'}^g(p) = \frac{1}{K'_{u'}} \sum_{k=1}^{K'_{u'}} C_{u'}(T_{SCH}(g-1) + p + \tau_{u'}^{RC}(k-1)), \quad (15)$$

$$g = 1, 2, \ldots, G$$

$$p = 1, 2, \ldots, \tau_{u'}^{RC}$$

In the equation, p represents a sample index after the combining process.

For correlation value $C_u^g(p)$ in the $g^{th}$ search section, a search is carried out to determine whether or not there is a correlation value exceeding an advance wave determination threshold value $w_{u'}$ by the extent of the maximum delay time $\tau_{max}$ before or after the temporary initial position $P'_{U'}$. The maximum delay time $\tau_{max}$ may be any appropriate value set to a value determined in a system. For example, the advance wave determination threshold value $w_{u'}$ may be set as in equation (16) by having as a reference a correlation value $C_u(P_{u'})$ obtained at the time of determination of the temporary initial position $P_{u'}$.

$$w_{u'} = C_u(p'_{u'}) \times \lambda_{u'}, \quad 0 < \lambda \leq 1 \quad (16)$$

In the equation, $\lambda_{u'}$ is a coefficient for determining advance wave position in mode U' satisfying $0 < \lambda_{u'} \leq 1$. Additionally, using equation (17), a determination is made whether or not there is a correlation value exceeding the advance wave determination threshold value $w_{u'}$ by the extent of $\tau_{max}$ before or after the temporary initial position $P'_{U'}$.

$$C_u^g(\text{mod}(p,\tau_u^{RC})) \geq w_{u'}, p'_{u'} - \tau_{max} \leq p \leq p'_{u'} + \tau_{max} \quad (17)$$

The determination expressed by equation (17) is made for the first to $G^{th}$ search sections. If the assumed number of paths corresponds to L' wave, a maximum of L' number of correlation values satisfying equation (17) are selected from the largest value, and the position indicated by these correlation values is determined as a path position $p_l$. However, a maximum of L' number of correlation values are selected so as not to select the same path positions in G number of search sections. At this time, the path position with the smallest number is determined as the initial position $P_{U'}$ (reference position) of a training block K1 that appears for the first time after the position at which frame receiving has started. The delay time $\tau_l$ of a multipath in a channel can be converted by a relative difference between the determined initial position $P_{U'}$ and the path position $P_l$ obtained from equation (17). As described above, calculating correlation values by using a reference signal from a receiving signal and then processing them based on the time axis of the correlation value sequences obtained by the reference signal of a training block K1 makes it possible to determine the initial position of a training block K1 that appears for the first time after the position at which frame receiving has started.

Next, the operation of a block position determination module 602 will be described in detail.

Using an initial position $P_{U'}$ obtained by the calculations described above, the block position determination module 602 performs the process of determining the initial position of the interleaver blocks and the size of interleaver blocks. In this determining process, the mode "low" utilizes the fact that with regard to the last data block of the interleaver blocks, a known signal different from known signals corresponding to the other data blocks is transmitted to this last data block. The mode "mid" and mode "high" utilize the fact that control signals are transmitted to the last two training blocks.

Before a size of interleaver block is determined, it is impossible to determine whether or not the size of interleaver block used in a receiving frame is short or long. Accordingly, it is preferable to estimate the size of interleaver block in the case of long interleaver and monitor correlation values. Therefore, in order to determine the initial position of interleaver blocks and the size of interleaver block, it is preferable that a target section length N to be subjected to processing satisfy the conditions expressed by equation (18).

$$N = T_{blk}^{(L)} \times \beta \quad (18)$$

wherein $T_{blk}^{(L)}$ represents a size of long-interleaver block that has 11520 symbols and $\beta$ is an integer of 1 or greater. As a target section length N, a period shorter than the size of interleaver block in long interleaver may be subjected to processing.

Next, a method for calculating the initial position of interleaver blocks and the size of interleaver block will be described for each of the modes.

<Mode "low">

In mode "low", whereas each data block K5 includes one of sequences 17 to 20, data block K5' that is the last interleaver block includes one of sequences 21 to 24. Therefore, among correlation values $Z'_{low, 21}$ to $Z'_{low, 24}$ output from the correlator that has reference signals $r_{low, 21}$ to $r_{low, 24}$, the maximum correlation value may be focused in each time sample. Maximum correlation value $Z_{low, B}$ can be calculated using equation (19), which makes it possible to obtain a high correlation value at the time it is located in the initial position of last data block K5' of the interleaver blocks.

$$Z_{low,B}(t) = \max(Z'_{low,21}(t), Z'_{low,22}(t), Z'_{low,23}(t), Z'_{low,24}(t)) \quad (19)$$

In this case, by using the initial position $P_{u'}$ of a training block K1 that appears for the first time after the position at which frame receiving has started, only a correlation value $C_{low, B}(q)$ at the time of its possibly being located in the initial position of last data block K' of the interleaver blocks in a target section length N may be focused on. In the target section length N, correlation values $C'_{low, B}(q)$ at the time of its possibly being located at the initial position of last data block K' of the interleaver blocks are expressed by equation (20).

$$C'_{low,B}(q) = \frac{1}{L'} \sum_{l=1}^{L'} Z_{low,B}(t + \tau'_l), \quad (20)$$

$$q = 1, 2, \ldots, Q_{low}$$

$$t = P_{low} + 128 + \tau_{low}^{RC}(q-1)$$

In the equation, $Q_{low}$ is a candidate number for the initial position of last data block K5' of the interleaver blocks in the target section length N, q is a candidate point index. Using Equation (18), $Q_{low}$ is expressed as $Q_{low} = N/\tau_{low}^{RC} = T_{blk}(L) \times \beta/\tau_{low}^{RC} = 72 \times \beta$. In the determining process for the initial position $P_{U'}$ by the path determination module 601 described above, since the number (L') of channel paths and a path delay time $\tau_l$ are determined, correlation value $C_{low}, B(q)$ in equation (20) represents a value after a combining process involving the paths.

The initial position of last data block K5' of the interleaver blocks is determined by assuming that a size of interleaver block is short. In this case, if the size of interleaver block in short interleaver is $T_{blk}^{(S)}$, the number of the last data blocks of the interleaver blocks is $K_S$ ($=N/T_{blk}^{(S)}$) in a target section length N. The number of candidates for the last data blocks of the interleaver blocks in an interleaver size $T_{blk}^{(S)}$ ($=1440$ symbols) in short interleaver (i.e., the sum of data blocks K5 and K5' present in the interleaver size $T_{blk}^{(S)}$) is nine, and one of these nine candidates will necessarily be last data block K5' of the interleaver blocks.

Therefore, $Q_{low}$ is expressed by $Q_{low}=K_S \times 9$. With regard to a correlation value $C'_{low, B}$ at the candidate point in the initial position of last data block K5' of a $Q_{low}$ number of interleaver blocks, which is expressed by Equation 20, a correlation value $C_{low, B}^{(S)}$ given by combining nine candidates as expressed by equation (21) is used. Thereby, accuracy in determining the initial position of last data block K5' of the interleaver blocks can be improved.

$$C_{low,B}^{(S)}(j) = \frac{1}{K_S}\sum_{k=1}^{K_S} C'_{low,B}(j+9(k-1)), \quad (21)$$

$$j = 1, 2, \ldots, 9$$

Among the nine correlation values $C_{low, B}^{(S)}$, if the maximum value is not less than a threshold value $v_{low}$ as expressed by equation (22), a block position determination module 602 determines that a frame in which short interleaver is applied has been received. Further, the point j' at which the maximum value is obtained among correlation values $C_{low, B}^{(S)}$ is determined as the last data block index of the interleaver blocks.

$$j' = \underset{j}{\mathrm{argmax}}\left(C_{low,B}^{(S)}(j)\right), \quad (22)$$

$$\text{where } \max\left(C_{low,B}^{(S)}(j)\right) \geq v_{low}$$

As a result, the block position determination module 602 can calculate the initial position of the immediately subsequent interleaver blocks from, for example, equation (23), and can also determine the initial positions of following blocks in the same manner.

$$t_{low} = P_{low} + \tau_{low}^{RC} \times j' \quad (23)$$

In the present embodiment, arithmetic average is used to combine the correlation values. However, the embodiment is not limited by this, but as long as receiving of the last data block of the interleaver blocks can be determined, any method suffices, such as adding correlation values until the sum of the correlation values are not less than a threshold value, or multiplying correlation values located at candidate points for the last data block of the interleaver blocks.

Conversely, if the maximum value among the nine correlation values $C_{low, B}^{(S)}$ is less than threshold value $v_{low}$, processing is performed based on the assumption that a size of interleaver block is long interleaver. In this case, the number of the last data blocks of the interleaver blocks in a target section length N is $K_L$ ($=N/T_{blk}^{(L)}$). Additionally, the number of candidates for the last data block of the interleaver blocks in an interleaver size $T_{blk}^{(L)}$ ($=11520$ symbols) in long interleaver (i.e., the sum of data blocks K5 and K5' present in the interleaver size $T_{blk}^{(L)}$) is 72. One of the 72 candidates will necessarily be last data block K5' of the interleaver blocks. Therefore, $Q_{low}$ is expressed by $Q_{low}=K_L \times 72$. With regard to a correlation value $C_{low, B}$ at the candidate point in the initial position of last data block K5' of a $Q_{low}$ number of interleaver blocks, which was explained in equation (20), correlation values $C_{low, B}^{(L)}$ given by combining 72 candidate as expressed by equation (24) is used. Thereby, accuracy in determining the initial position of last data block K5' of the interleaver blocks can be improved.

$$C_{low,B}^{(L)}(j) = \frac{1}{K_L}\sum_{k=1}^{K_L} C'_{low,B}(j+72(k-1)), \quad (24)$$

$$j = 1, 2, \ldots, 72$$

Among the 72 correlation values the $C_{low, B}^{(L)}$, the point j' at which the maximum value is obtained as expressed by equation (25) is determined as the last data block index of the interleaver blocks.

$$j' = \underset{j}{\mathrm{argmax}}(C_{low,B}^{(L)}(j)) \quad (25)$$

Here, in the case of long interleaver, the number of last data blocks K5' of the interleaver blocks in the target module N is one eighths of that in short interleaver. Therefore, since resistance to noise and fading differ, determining accuracy in long interleaver may be inferior to that in short interleaver.

To avoid this, correlation values $Z'_{low, 17}$ to $Z'_{low, 20}$ from the correlator having reference signals $r_{low, 17}$ to $r_{low, 20}$ are used as correlation values $C_{low, A}^{(L)}$ obtained by performing the same processes as for Equations (19), (20), and (24).

If the $j'^{th}$ one indicates the last data block index of the interleaver blocks, the $j'^{th}$ one of correlation values $C_{low, B}^{(L)}$ is assumed to indicate a high value, and the $j'^{th}$ one of correlation values $C_{low, A}^{(L)}$ is assumed to indicate a low value. In addition, ones other than the $j'^{th}$ one of correlation values $C_{low, B}^{(L)}$ are assumed to indicate low values, and ones other than the $j'^{th}$ one of correlation values $C_{low, A}^{(L)}$ are assumed to indicate high values. Therefore, by calculating, in each sample j, the ratio $D_{low}^{(L)}$ of correlation value $C_{low, B}^{(L)}$ to correlation value $C_{low, A}^{(L)}$ as given by, for example, equation (26), only the $j'^{th}$ sample of ratios $D_{low}^{(L)}$ has a high value and samples other than the $j'^{th}$ one have low values. Such a method eliminates the need to buffer data several times longer than the size of long interleaver, which buffering has the result that many last blocks are present in received signals. Accordingly, the last data block in long interleaver can accurately be determined and buffer size can also be decreased.

$$D_{low}^{(L)}(j) = \frac{C_{low,B}^{(L)}(j)}{C_{low,A}^{(L)}(j)} \quad (26)$$

Therefore, as given by equation (27), the point j' at which the maximum value among ratios $D_{low}^{(L)}$ is determined as the index of the last data block of the interleaver blocks.

$$j' = \underset{j}{\mathrm{argmax}}(D_{low}^{(L)}(j)) \quad (27)$$

Thus, the initial position of the interleaver blocks in long interleaver can also be obtained by, for example, equation (28) in the same manner as short interleaver.

$$t_{low} = P_{low} + \tau_{low}^{RC} \times j' \quad (28)$$

<Mode "mid">

In mode "mid", a control signal block D1 and a control signal block D2 respectively are transmitted to the last two training blocks of the interleaver blocks. Therefore, focusing on $Z_{mid, D1\_4}$ to $Z_{mid, D1\_7}$ output from the correlator that has reference signals $r_{mid, D1\_4}$ to $r_{mid, D1\_7}$ and on $Z_{mid, D2\_4}$ to $Z_{mid, D2\_7}$ output from the correlator that has reference signals $r_{mid, D2\_4}$ to $r_{mid, D2\_7}$, makes it possible to obtain a high correlation value at the time of processing control signal block D1 or D2.

Next will be described the method in which the size of interleaver blocks is determined by using $Z_{mid, D1\_4}$ to $Z_{mid, D1\_7}$ and $Z_{mid, D2\_4}$ to $Z_{mid, D2\_7}$ output from the corresponding correlators, the initial position of control signal block D1 of the interleaver blocks is determined, and then the initial position of the interleaver blocks is determined.

As in mode "low", the initial position of interleaver blocks and so on may be determined by observing only the maximum correlation values in corresponding time samples based on corresponding outputs from the group of correlators in a manner as expressed by equation (19), and combining the correlation values observed within a target section length N. However, in mode "mid", since only a specific one of the group of correlators outputs control signal blocks D1 and D2, it is preferable to combine correlation values for each of the correlators within the target section length N prior to mode "mid". Thereafter, the maximum values are observed in the corresponding candidate correlator for each of control signal blocks D1 and D2, the correlation values output from the corresponding correlator are combined, and then the initial position of the interleaver block may be determined.

Using the initial position $P_{u'}$ of training block K1 that appears for the first time after the position at which frame receiving has started makes it possible to focus on only correlation values $Z''_{mid, D1\_f}(q)$ and $Z''_{mid, D2\_f}(q)$ at the time of their possibly being located in the respective initial positions of last control signal blocks D1 and D2 of the interleaver blocks within a target section length N. Correlation values $Z''_{mid, D1\_f}(q)$ and $Z''_{mid, D2\_f}(q)$ at the time of their possibly being located in the respective initial positions of last control signal blocks D1 and D2 of the interleaver blocks within the target section length N are expressed by equations (29) and (30) respectively.

$$Z''_{mid,D1\_f}(q) = \frac{1}{L'}\sum_{l=1}^{L'} Z_{mid,D1\_f}(t + \tau'_l), \quad (29)$$
$$f = 4, 5, 6, 7$$
$$q = 1, 2, \ldots, Q_{mid}$$
$$t = P_{mid} + 80 + \tau^{RC}_{mid}(q-1)$$

$$Z''_{mid,D2\_f}(q) = \frac{1}{L'}\sum_{l=1}^{L'} Z_{mid,D2\_f}(t + \tau'_l), \quad (30)$$
$$f = 4, 5, 6, 7$$
$$q = 1, 2, \ldots, Q_{mid}$$
$$t = P_{mid} + 120 + \tau^{RC}_{mid}(q-1)$$

In the equations, $Q_{mid}$ is the number of candidates for a training block having the possibility of including each of control signal blocks D1 and D2 within a target section length N, and q is an index at the candidate point. $Q_{mid}$ is expressed as follows: $Q_{mid} = N/\tau^{RC}_{mid} = T_{blk}^{(L)} \times \beta / \tau^{RC}_{mid} = 72 \times \beta$. Since the number of paths L' and path delay time $\tau_1$ of a channel are found by the process of determining the initial position $P_{u'}$, described above, correlation values $Z''_{mid, D1\_f}(q)$ and $Z''_{mid, D2\_f}(q)$ expressed by equations (29) and (30) respectively represent values after the process of combining the paths.

To determine the initial position of last control signal block D1 among the interleaver blocks is made by assuming that the size of interleaver block is short, as in the case of mode "low".

If the size of the interleaver blocks in short interleaver is $T_{blk}^{(S)}$, the number of last control signal block D1 or D2 in a target section length N is $K_S$ ($=N/T_{blk}^{(S)}$). In addition, the number of candidates for last control signal block D1 or D2 of the interleaver blocks in interleaver size $T_{blk}^{(S)}$ (=1440 symbols) in short interleaver is nine. That is, the sum of control signal block D1 and training blocks K3 present in the interleaver size $T_{blk}^{(S)}$ or the sum of control signal block D2 and training blocks K4 present in this interleaver size is nine.

As a result, one of the nine candidates will necessarily be last control signal block D1 or D2 of the interleaver blocks. Therefore, $Q_{mid}$ is expressed as follows: $Q_{mid} = K_S \times 9$. Accordingly, correlation values $Z''_{mid, D1\_f}$ and $Z''_{mid, D2\_f}$ at the candidates points in the respective initial positions of last control signal blocks D1 and D2 of a $Q_{mid}$ number of interleaver blocks explained in the descriptions of equations (29) and (30) are converted into correlation values $Z_{mid,D1\_f}^{(S)}$ and $Z_{mid, D2\_f}^{(S)}$, respectively, given by combining nine candidates as expressed by equations (31) and (32). This way, accuracy in determining the respective initial positions of last control signal blocks D1 and D2 of the interleaver blocks can be improved.

$$Z_{mid,D1\_f}^{(S)}(j) = \frac{1}{K_S}\sum_{k=1}^{K_S} Z''_{mid,D1\_f}(j + 9(k-1)), \quad (31)$$
$$j = 1, 2, \ldots, 9$$

$$Z_{mid,D2\_f}^{(S)}(j) = \frac{1}{K_S}\sum_{k=1}^{K_S} Z''_{mid,D2\_f}(j + 9(k-1)), \quad (32)$$
$$j = 1, 2, \ldots, 9$$

Next, with regard to control signal blocks D1 and D2, maximum values $C'_{mid, D1}^{(S)}$ and $C'_{mid, D2}^{(S)}$ are obtained in the corresponding candidate correlators from equations (33) and (34) respectively.

$$C'_{mid,D1}^{(S)}(j) = \max(Z_{mid,D1\_6}^{(S)}(j), Z_{mid,D1\_7}^{(S)}(j)),$$
$$j = 1, 2, \ldots, 9 \quad (33)$$

$$C'_{mid,D2}^{(S)}(j) = \max(Z_{mid,D2\_4}^{(S)}(j), Z_{mid,D2\_5}^{(S)}(j),$$
$$Z_{mid,D2\_6}^{(S)}(j), Z_{mid,D2\_7}^{(S)}(j)), j = 1, 2, \ldots, 9 \quad (34)$$

In equation (33), only $Z_{mid, D1\_6}^{(S)}$ and $Z_{mid, D1\_7}^{(S)}$ are used as candidates. This is because it is apparent from FIG. 4 that the value of D1 is only 6 or 7 in the case of short interleaver in mode "mid". As just described, performing the process by assuming an interleaver size in mode "mid", the number of correlation values to be dealt with can be narrowed, thus reducing erroneous determination.

Next, a correlation value $C_{mid,D}^{(S)}$ is obtained by combining correlation values $C'_{mid,D1}^{(S)}$ and $C'_{mid,D2}^{(S)}$, as expressed by Equation (35).

$$C_{mid,D}^{(S)}(j) = \frac{C'^{(S)}_{mid,D1}(j) + C'^{(S)}_{mid,D2}(j)}{2}, \quad (35)$$

$$j = 1, 2, \ldots, 9$$

Among the nine correlation values $C_{mid,D}^{(S)}$, if the maximum equals or exceeds a threshold value $v_{mid}$, as expressed by equation (36), the block position determination module 602 determines that the frame in which short interleaver is applied has been received. The point j' at which the maximum is obtained among correlation values $C_{mid,D}^{(S)}$ is determined as the index of last control signal block D1 of the interleaver blocks.

$$j' = \underset{j}{\operatorname{argmax}}(C_{mid,D}^{(S)}(j)), \quad (36)$$

where $\max(C_{mid,D}^{(S)}(j)) \geq v_{mid}$

Thus, the initial position of the interleaver blocks can be obtained as expressed by, for example, equation (37).

$$t_{mid} = P_{mid} + \tau_{mid}^{RC} \times j' - 20 \quad (37)$$

Conversely, if the maximum of the nine correlation values $C_{mid,D}^{(S)}$ is less than threshold value $v_{mid}$, a determination is made that the frame being received is long interleaver. In this case, the numbers of each of last control signal blocks D1 and D2 of interleaver blocks is $K_L$ ($=N/T_{blk}^{(L)}$) in the target section length N. In addition, the number of candidates of each of last control signal blocks D1 and D2 of the interleaver blocks present in the interleaver size $T_{blk}^{(L)}$ (=11520 symbols) in long interleaver (i.e., each of the sums of control signal block D1 and training blocks K3 present in the interleaver size $T_{blk}^{(L)}$ and of control signal block D2 and training blocks K4 present in this interleaver size) is 72. Accordingly, one of the 72 candidates will necessarily be last control signal block D1 or D2.

Therefore, $Q_{mid}$ is expressed as follows: $Q_{mid} = K_L \times 72$. Accordingly, correlation values $Z''_{mid,D1\_f}$ and $Z''_{mid,D2\_f}$ at candidate points in the respective initial positions of last control signal blocks D1 and D2 of a $Q_{mid}$ number of interleaver blocks explained in the descriptions of Equations (29) and (30) are converted into correlation values $Z_{mid,D1\_f}^{(L)}$ and $Z_{mid,D2\_f}^{(L)}$ given by combining 72 candidates as expressed by Equations (38) and (39). In this way, accuracy in determining the respective initial positions of last control signal blocks D1 and D2 of the interleaver blocks can be improved.

$$Z_{mid,D1\_f}^{(L)}(j) = \frac{1}{K_L} \sum_{k=1}^{K_L} Z''_{mid,D1\_f}(j + 72(k-1)), \quad (38)$$

$$j = 1, 2, \ldots, 72$$

$$Z_{mid,D2\_f}^{(L)}(j) = \frac{1}{K_L} \sum_{k=1}^{K_L} Z''_{mid,D2\_f}(j + 72(k-1)), \quad (39)$$

$$j = 1, 2, \ldots, 72$$

Next, with regard to control signal blocks D1 and D2, maximum values $C'_{mid,D1}^{(L)}$ and $C'_{mid,D2}^{(L)}$ are obtained in the corresponding candidate correlators as in equations (40) and (41) respectively.

$$C'_{mid,D1}^{(L)}(j) = \max(Z_{mid,D1\_4}^{(L)}(j), Z_{mid,D1\_5}^{(L)}(j)), j=1,2,\ldots,72 \quad (40)$$

$$C'_{mid,D2}^{(L)}(j) = \max(Z_{mid,D2\_4}^{(L)}(j), Z_{mid,D2\_5}^{(L)}(j), Z_{mid,D2\_6}^{(L)}(j), Z_{mid,D2\_7}^{(L)}(j)), \quad j=1,2,\ldots,72 \quad (41)$$

In equation (40), only $Z_{mid,D1\_4}^{(L)}$ and $Z_{mid,D1\_5}^{(L)}$ are used as candidates. This is because it is apparent from FIG. 4 that the value of D1 is only 4 or 5 in long interleaver in mode "mid".

Next, correlation values $C_{mid,D}^{(L)}$ are obtained by combining correlation values $C'_{mid,D1}^{(L)}$ and $C'_{mid,D2}^{(L)}$, as expressed by equation (42).

$$C_{mid,D}^{(L)}(j) = \frac{C'^{(L)}_{mid,D1}(j) + C'^{(L)}_{mid,D2}(j)}{2}, \quad (42)$$

$$j = 1, 2, \ldots, 72$$

The point j' at which the maximum is obtained among the 72 correlation values $C_{mid,D}^{(L)}$ as expressed by equation (43) is determined as the index of last control signal block D1 of the interleaver blocks.

$$j' = \underset{j}{\operatorname{argmax}}(C_{mid,D}^{(L)}(j)) \quad (43)$$

Here, in the case of long interleaver, the number of last data blocks D1 or D2 of the interleaver blocks in the target section length N is one eighths of that in short interleaver. Therefore, the same process as that in mode "low" is performed. Specifically, a correlation value $Z_{mid,3}$ from the correlator having a reference signal $r_{mid,3}$ and a correlation value $Z_{mid,4}$ from the correlator having a reference signal $r_{mid,4}$ are used as correlation values $C_{mid,3\_4}^{(L)}$ obtained by performing the same processes as for equations (37), (38), (39), (40) and (41).

If the $j'^{th}$ one indicates the index of last control signal block D1 of the interleaver blocks, the $j'^{th}$ one of correlation values $C_{mid,D}^{(L)}$ indicates a high value, and the $j'^{th}$ one of correlation values $C_{mid,3\_4}^{(L)}$ indicates a low value. In addition, ones other than the $j'^{th}$ one of correlation values $C_{mid,d}^{(L)}$ indicate low values, and ones other than the $j'^{th}$ one of correlation values $C_{mid,3\_4}^{(L)}$ indicate high values. Therefore, by calculating, in each sample j, the ratio $D_{mid}^{(L)}$ of correlation value $C_{mid,D}^{(L)}$ to correlation value $C_{mid,3\_4}^{(L)}$ as given by equation (44), only the $j'^{th}$ sample of ratios $D_{mid}^{(L)}$ has a high value and samples other than the $h'^{th}$ one have low values.

$$D_{mid}^{(L)}(j) = \frac{C_{mid,D}^{(L)}(j)}{C_{mid,3\_4}^{(L)}(j)} \quad (44)$$

Therefore, as given by equation (45), the point j' at which the maximum value of ratios $D_{mid}^{(L)}$ is taken is determined as the index of last signal control block D1 of the interleaver blocks.

$$j' = \underset{j}{\mathrm{argmax}}(D_{mid}^{(L)}(j)) \quad (45)$$

Thus, the initial position of the interleaver blocks can also be obtained by, for example, equation (46).

$$t_{mid} = P_{mid} + \tau_{mid}^{RC} \times j' - 20 \quad (46)$$

<Mode "high">

In mode "high" also, a control signal block D1 and a control signal block D2 respectively are transmitted to the last two training blocks of the interleaver blocks as in mode "mid". Therefore, focusing on $Z_{high, D1\_4}$ to $Z_{high, D1\_7}$ output from the correlator that has reference signals $r_{high, D1\_4}$ to $r_{high, D1\_7}$ and on $Z_{high, D2\_4}$ to $Z_{high, D2\_7}$ output from the correlator that has reference signals $r_{high, D2\_4}$ to $r_{high, D2\_7}$ makes it possible to obtain a high correlation value at the time of processing control signal block D1 or D2.

The method for calculating the initial position of interleaver blocks and the size of the interleaver blocks is the same as that in mode "mid".

Specifically, using the initial position $P_u$, of training block K1 that appears for the first time after the position at which frame receiving has started makes it possible to focus on only correlation values $Z''_{high, D1\_f}(q)$ and $Z''_{high, D2\_f}(q)$ at the time of their possibly being located in the respective initial positions of last control signal blocks D1 and D2 of the interleaver blocks within a target section length N. Correlation values $Z''_{high, D1\_f}(q)$ and $Z''_{high, D2\_f}(q)$ at the time of their possibly being located in the respective initial positions of last control signal blocks D1 and D2 of the interleaver blocks within the target section length N are expressed by equations (47) and (48) respectively.

$$Z''_{high,D1\_f}(q) = \frac{1}{L'} \sum_{l=1}^{L'} Z_{high,D1\_f}(t + \tau'_l), \quad (47)$$

$f = 4, 5, 6, 7$ $q = 1, 2, \ldots, Q_{high}$ $t = P_{high} + 384 + \tau_{high}^{RC}(q-1)$ $$Z''_{high,D2\_f}(q) = \frac{1}{L'} \sum_{l=1}^{L'} Z_{high,D2\_f}(t + \tau'_l), \quad (48)$$

$f = 4, 5, 6, 7$ $q = 1, 2, \ldots, Q_{high}$ $t = P_{high} + 432 + \tau_{high}^{RC}(q-1)$ In the equations, $Q_{high}$ is the number of candidates for the training block that may possibly include control signal blocks D1 and D2 within a target section length N, and q is an index at the candidate point. $Q_{high}$ is also expressed as follows: $Q_{high} = N/\tau_{high}^{RC} = T_{blk}^{(L)} \times \beta/\tau_{high}^{RC} = 24 \times \beta$. Since the number of paths L' and path delay time $\tau_1$ of a channel are found by the process of determining the initial position $P_u$, correlation values $Z''_{high, D1\_f}(q)$ and $Z''_{high, D2\_f}(q)$ expressed by equations (47) and (48) respectively represent values after the process of combining the paths.

To determine the initial position of last control signal block D1 of the interleaver blocks is made by assuming that the size of interleaver block is short. In this case, if the size of the interleaver blocks in short interleaver is $T_{blk}^{(S)}$, the number of last control signal block D1 or D2 in a target section length N is $K_S$ (=$N/T_{blk}^{(S)}$). In addition, the number of candidates for last control signal block D1 or D2 of the interleaver blocks in the interleaver size $T_{blk}^{(S)}$ (=1440 symbols) in short interleaver is three. That is, the sums of control signal block D1 and training blocks K9 present in the interleaver size $T_{blk}^{(S)}$ or of control signal block D2 and training blocks K10 present in this interleaver size is three. One of the three candidates will necessarily be last control signal block D1 or D2 of the interleaver blocks. Therefore, $Q_{high}$ is expressed as follows: $Q_{high}$ $K_S \times 3$. Accordingly, correlation values $Z''_{mid, D1\_f}$ and $Z''_{mid, D2\_f}$ at the candidate points in the respective initial positions of last control signal blocks D1 and D2 of a $Q_{mid}$ number of interleaver blocks explained in the descriptions of equations (29) and (30) can use correlation values $Z_{high, D1\_f}^{(S)}$ and $Z_{high, D2\_f}^{(S)}$, respectively, given by combining three candidates as expressed by equations (49) and (50). In this way, accuracy in determining the respective initial positions of last control signal blocks D1 and D2 of the interleaver blocks can be improved.

$$Z_{high,D1\_f}^{(S)}(j) = \frac{1}{K_S} \sum_{k=1}^{K_S} Z''_{high,D1\_f}(j + 3(k-1)), \quad (49)$$

$j = 1, 2, 3$ $$Z_{high,D2\_f}^{(S)}(j) = \frac{1}{K_S} \sum_{k=1}^{K_S} Z''_{high,D2\_f}(j + 3(k-1)), \quad (50)$$

$j = 1, 2, 3$

Next, with regard to control signal blocks D1 and D2, maximum values $C'_{high, D1}^{(S)}$ and $C'_{high, D2}^{(S)}$ are obtained in the corresponding candidate correlators as in equations (51) and (52) respectively.

$$C'_{high,D1}^{(S)}(j) = \max(Z_{high,D1\_6}^{(S)}(j), Z_{high,D1\_7}^{(S)} (j)), j=1,2,3 \quad (51)$$

$$C'_{high,D2}^{(S)}(j) = \max(Z_{high,D2\_4}^{(S)}(j), A_{high,D2\_6}^{(S)}(j), Z_{high,D2\_7}^{(S)}(j)), j=1,2,3 \quad (52)$$

In equation (51), only $Z_{high, D1\_6}^{(S)}$ and $Z_{high, D1\_7}^{(S)}$ are used as candidates. This is because it is apparent from FIG. 4 that the value of D1 is only 6 or 7 in the case of short interleaver in mode "high". Also, in equation (52), only $Z_{high, D2\_4}^{(S)}$, $Z_{high, D2\_6}^{(S)}$, and $Z_{high, D2\_7}^{(S)}$ are used as candidates. This is because it is apparent from FIG. 4 that the value of D2 is only 4, 6, or 7 in the case of short interleaver in mode "high". As just described, performing the process by assuming an interleaver size in mode "high" as well, the number of correlation values to be dealt with can be narrowed, thus reducing erroneous determination.

Next, a correlation value $C_{high, D}^{(S)}$ is obtained by combining correlation values $C'_{high, D1}^{(S)}$ and $C'_{high, D2}^{(S)}$, as expressed by equation (53).

$$C_{high,D}^{(S)}(j) = \frac{C'^{(S)}_{high,D1}(j) + C'^{(S)}_{high,D2}(j)}{2}, \quad (53)$$

$j = 1, 2, 3$

Among the three correlation values $C_{high, D}^{(S)}$, if the maximum equals or exceeds a threshold value $v_{high}$, as expressed by equation (54), the block position determination module 602 determines that a frame in which short interleaver is applied has been received. The point j' at which the maximum of correlation values $C_{high,D}^{(S)}$ is obtained is determined as the index of last control signal block D1 of the interleaver blocks.

$$j' = \underset{j}{\operatorname{argmax}}(C_{high,D}^{(S)}(j)), \quad (54)$$

$$\text{where } \max(C_{high,D}^{(S)}(j)) \geq v_{high}$$

Thus, the initial position of the interleaver blocks can be obtained as expressed by, for example, equation (55).

$$t_{high} = P_{high} + \tau_{high}^{RC} \times j' - 32 \quad (55)$$

Conversely, if the maximum of the three correlation values $C_{high,D}^{(S)}$ is less than threshold value $v_{high}$, a determination is made that the frame being received is long interleaver. In this case, the number of each of last control signal blocks D1 and D2 among interleaver blocks is $K_L$ ($=N/T_{blk}^{(L)}$) in the target section length N. In addition, the number of candidates of each of last control signal blocks D1 and D2 of the interleaver blocks present in the interleaver size $T_{blk}^{(L)}$ (=11520 symbols) in long interleaver is 24. That is, the sums of control signal block D1 and training blocks K9 present in the interleaver size $T_{blk}^{(L)}$ or of control signal block D2 and training blocks K10 present in this interleaver size is 24. Accordingly, one of the 24 candidates will necessarily be last control signal block D1 or D2.

Therefore, $Q_{high}$ is expressed as follows: $Q_{high}=K_L \times 24$. Accordingly, correlation values $Z''_{high,D1\_f}$ and $Z''_{high,D2\_f}$ at candidate points in the respective initial positions of last control signal blocks D1 and D2 of a $Q_{high}$ number of interleaver blocks explained in the descriptions of equations (47) and (48) are converted into correlation value $Z_{high,D1\_f}^{(L)}$ and $Z_{high,D2\_f}^{(L)}$ given by combining 24 candidates as expressed by equations (56) and (57). In this way, accuracy in determining the respective initial positions of last control signal blocks D1 and D2 of the interleaver blocks can be improved.

$$Z_{high,D1\_f}^{(L)}(j) = \frac{1}{K_L} \sum_{k=1}^{K_L} Z''_{high,D1\_f}(j + 24(k-1)), \quad (56)$$

$$j = 1, 2, \ldots, 24$$

$$Z_{high,D2\_f}^{(L)}(j) = \frac{1}{K_L} \sum_{k=1}^{K_L} Z''_{high,D2\_f}(j + 24(k-1)), \quad (57)$$

$$j = 1, 2, \ldots, 24$$

Next, with regard to control signal blocks D1 and D2, maximum values $C'_{high,D1}^{(L)}$ and $C'_{high,D2}^{(L)}$ are obtained in the corresponding candidate correlators as in equations (58) and (59) respectively.

$$C'_{high,D1}^{(L)}(j) = Z_{high,D1\_4}^{(L)}(j), j=1,2,3 \quad (58)$$

$$C'_{high,D2}^{(L)}(j) = Z_{high,D2\_4}^{(L)}(j), j=1,2,3 \quad (59)$$

In Equation (58), only $Z_{high,D1\_4}^{(L)}$ is used as a candidate. This is because it is apparent from FIG. 4 that the value of D1 is only 4 in the case of long interleaver in mode "high". Also, in Equation (59), only $Z_{high,D2\_4}^{(L)}$ is used as a candidate. This is because it is apparent from FIG. 4 that the value of D2 is only 4 in the case of long interleaver in mode "high". As just described, performing the process by assuming an interleaver size, the number of correlation values to be dealt with can be narrowed, thus reducing erroneous determination.

Next, correlation values $C_{high,D}^{(L)}$ are obtained by combining correlation values $C'_{high,D1}^{(L)}$ and $C'_{high,D2}^{(L)}$, as expressed by Equation (60).

$$C_{high,D}^{(L)}(j) = \frac{C'_{high,D1}^{(L)}(j) + C'_{high,D2}^{(L)}(j)}{2}, \quad (60)$$

$$j = 1, 2, \ldots, 24$$

The point j' at which the maximum is obtained among the 24 correlation values $C_{high,D}^{(L)}$ as expressed by equation (61) is determined as the index of last control signal block D1 of the interleaver blocks.

$$j' = \underset{j}{\operatorname{argmax}}(C_{high,D}^{(L)}(j)) \quad (61)$$

Here, in the case of long interleaver, the number of last data block D1 or D2 of the interleaver blocks in the target section length N is one eighths of that in short interleaver. A correlation value $Z_{high,9}$ from the correlator having a reference signal $r_{high,9}$ and a correlation value $Z_{high,10}$ from the correlator having a reference signal $r_{high,10}$ are used as correlation values $C_{high,9\_10}^{(L)}$ obtained by performing the same processes as with equations (47), (48), (49), (50) and (59). Therefore, by calculating, in each sample j, the ratio $D_{high}^{(L)}$ of correlation value $C_{high,D}^{(L)}$ to correlation value $C_{high,9\_10}^{(L)}$ as given by equation (62), only the $j^{th}$ sample of ratios $D_{high}^{(L)}$ has a high value and the samples other than the $j^{th}$ one have low values.

$$D_{high}^{(L)}(j) = \frac{C_{high,D}^{(L)}(j)}{C_{high,9\_10}^{(L)}(j)} \quad (62)$$

Therefore, as given by equation (63), the point j' at which the maximum value of ratios $D_{high}^{(L)}$ is taken is determined as the index of last signal control block D1 of the interleaver blocks.

$$j' = \underset{j}{\operatorname{argmax}}(D_{high}^{(L)}(j)) \quad (63)$$

Thus, the initial position of the interleaver blocks can be obtained by, for example, equation (64).

$$t_{high} = P_{high} + \tau_{high}^{RC} \times j' - 32 \quad (64)$$

As described above, referring to known signal intervals and known signal periods in each mode makes it possible to determine the initial position of interleaver blocks and the size of the interleaver blocks, thus performing a data signal decoding process, which is the subsequent step, at an appropriate time.

In each mode described above, the initial position of the last block (i.e., a data block K5' in mode "low", and control signal blocks in mode "middle" and mode "high") among interleaver blocks is determined by assuming first that the size of the interleaver blocks is short interleaver. Next, according to the result of the determination, a determination of long interleaver is made. However, long interleaver may be assumed first.

A case where the foregoing determination is made by assuming first that the size of the interleaver blocks is long will now be described in detail using mode "low" as an example. Among correlation values each of which has been given by combining the correlation values at the candidate points in the initial position of last data block K5' of the interleaver blocks, if the number of correlation values that are not less than a threshold value is one, the determination is made that long interleaver is used. Thereafter, from the point of this correlation value, the initial position of the interleaver blocks in long interleaver can be determined. Conversely, if the number of correlation values that are not less than the threshold value is more than one, the determination is made that short interleaver is used. Then, from the points of these correlation values, the initial position of the interleaver blocks can be determined.

The wireless receiving apparatus according to the embodiment described above takes account of a delay time in a predetermined search section even in a multipath environment, thereby determining the initial position of a desired known signal and improving resistance to noise and fading. Additionally, a correlation value is calculated for a receiving signal, the initial position of a known signal serving as a reference is determined from this calculated correlation value, and then the position of a data block or control signal block interposed in the last interleaver blocks is determined, thereby appropriately determining the initial position of the interleaver blocks and information about the size of the interleaver blocks even in a case of receiving with frame preamble signal dropped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless receiving apparatus comprising:
a calculation module configured to calculate one or more first correlation values between a received signal and one or more reference signals, the reference signals corresponding to one or more first sequences which have a possibility of being used for known signals inserted in a frame of the receiving signal;
a first determination module configured to determine a reference position of a first known signal in the frame based on a second correlation value that is not less than a first threshold value, the first known signal being one of the known signals, the second correlation value being included in a first correlation value sequence, the first correlation value sequence being generated by combining the first correlation values according to a mode based on data rate of the receiving signal; and
a second determination module configured to determine the length of interleaver blocks by determining whether or not the maximum value of second correlation value sequence is not less than a second threshold value within a first period, the interleaver blocks being a unit for an interleaver process performed for the frame, the second correlation value sequence being generated by combining third correlation values, the third correlation values being between the receiving signal and each of reference signals which correspond to a plurality of second sequences used for a second known signal located at the trailing end of the interleaver blocks and being extracted at the timing of possibly being a second known signal according to the reference position, and to determine an initial position of the interleaver blocks based on the position of the maximum value.

2. The apparatus according to claim 1, wherein
if the maximum value is not less than the second threshold value, the second determination module determines that the length of the interleaver blocks corresponds to a first interleaver length and determines from the position of the maximum value an initial position of interleaver blocks in the first interleaver length, and
if the maximum value is less than the second threshold value, the second determination module determines that the length of the interleaver blocks corresponds to a second interleaver length greater than the first interleaver length and determines from the position of the maximum value an initial position of interleaver blocks in the second interleaver length.

3. The apparatus according to claim 2, wherein the second determination module determines, if a length of the interleaver blocks corresponds to the second interleaver length, a position of the second known signal in the frame from the ratio of the maximum value to the first correlation values of known signals that is other than the second known signal at timing of possibly being the second known signal.

4. The apparatus according to claim 1, wherein the second determination module selects correlation value samples, based on the reference position and according to a known signal period and a known signal interval that correspond to the mode, and processes the selected correlation value samples, the correlation value samples being obtained at timing of being possibly the second known signal, the known signal interval indicating a interval between adjacent known signals in a frame of the received signal, the known signal period indicating a period required for the same known signal to reappear in the frame.

5. The apparatus according to claim 2, wherein the second determination module combines only fourth correlation values corresponding to sequences determined by the mode and by whether the length of the interleaver blocks corresponds to the first interleaver length or the second interleaver length, with regard to the third correlation values.

6. The apparatus according to claim 1, wherein the first determination module generates the first correlation value sequence by combining the first correlation values based on the known signal period and the known signal interval corresponding to the mode, and if a plurality of second correlation values are generated, determines as the reference position a position of one of the second correlation values closest to an initial position of the receiving signal, at which signal receiving has started, the known signal interval indicating a interval between adjacent known signals in a frame of the received signal, the known signal period indicating a period required for the same known signal to reappear in the frame.

7. The apparatus according to claim 1, wherein the calculation module selects, if the receiving signal is in first mode, a data block not having the same first sequences among the interleaver blocks as the second known signal, and if the receiving signal is in second mode higher in data rate than the first mode, selects two control signal blocks as the second known signal.

8. A wireless receiving apparatus comprising:
a calculation module configured to calculate one or more first correlation values between a received signal and one or more reference signals, the reference signals corresponding to one or more first sequences which have a possibility of being used for known signals inserted in a frame of the receiving signal;

a first determination module configured to determine a reference position of a first known signal in the frame based on a second correlation value that is not less than a first threshold value, the first known signal being one of the known signals, the second correlation value being included in a first correlation value sequence, the first correlation value sequence being generated by combining the first correlation values according to a mode based on data rate of the receiving signal; and a second determination module configured to determine, if one correlation value that is not less than a second threshold value is included in a second correlation value sequence within a first period, the length of interleaver blocks as a first interleaver length and to determine an initial position of the interleaver blocks in the first interleaver length based on a position of the one correlation value, and configured to determine, if a plurality of correlation values that are not less than the second threshold value are included in the second correlation value sequence within the first period, the length of the interleaver blocks as a second interleaver length shorter than the first interleaver length, and to determine the initial position of the interleaver blocks in the second interleaver length based on a position of the plurality of correlation values, the interleaver blocks being a unit for an interleaver process performed for the frame, the second correlation value sequences being generated by combining third correlation values, the third correlation values being between the receiving signal and each of reference signals which correspond to a plurality of second sequences used for a second known signal located at the trailing end of the interleaver blocks and being extracted at the timing of possibly being a second known signal according to the reference position.

9. The apparatus according to claim 8, wherein the second determination module determines, if a length of the interleaver blocks corresponds to the first interleaver length, a position of the second known signal in the frame from the ratio of the maximum value to the first correlation values of known signals that is other than the second known signal at timing of possibly being the second known signal.

10. The apparatus according to claim 8, wherein the second determination module selects correlation value samples, based on the reference position and according to a known signal period and a known signal interval that correspond to the mode, and processes the selected correlation value samples, the correlation value samples being obtained at timing of being possibly the second known signal, the known signal interval indicating a interval between adjacent known signals in a frame of the received signal, the known signal period indicating a period required for the same known signal to reappear in the frame.

11. The apparatus according to claim 8, wherein the second determination module combines only fourth correlation values corresponding to sequences determined by the mode and by whether the length of the interleaver blocks corresponds to the first interleaver length or the second interleaver length, with regard to the third correlation values.

12. The apparatus according to claim 8, wherein the first determination module generates the first correlation value sequence by combining the first correlation values based on the known signal period and the known signal interval corresponding to the mode, and if a plurality of second correlation values are generated, determines as the reference position a position of one of the second correlation values closest to an initial position of the receiving signal, at which signal receiving has started, the known signal interval indicating a interval between adjacent known signals in a frame of the received signal, the known signal period indicating a period required for the same known signal to reappear in the frame.

13. The apparatus according to claim 8, wherein the calculation module selects, if the receiving signal is in first mode, a data block not having the same first sequences among the interleaver blocks as the second known signal, and if the receiving signal is in second mode higher in data rate than the first mode, selects two control signal blocks as the second known signal.

14. A wireless receiving method comprising:

calculating one or more first correlation values between a received signal and one or more reference signals, the reference signals corresponding to one or more first sequences which have a possibility of being used for known signals inserted in a frame of the receiving signal;

determining a reference position of a first known signal in the frame based on a second correlation value that is not less than a first threshold value, the first known signal being one of the known signals, the second correlation value being included in a first correlation value sequence, the first correlation value sequence being generated by combining the first correlation values according to a mode based on data rate of the receiving signal; and determining the length of interleaver blocks by determining whether or not the maximum value of second correlation value sequence is not less than a second threshold value within a first period, the interleaver blocks being a unit for an interleaver process performed for the frame, the second correlation value sequence being generated by combining third correlation values, the third correlation values being between the receiving signal and each of reference signals which correspond to a plurality of second sequences used for a second known signal located at the trailing end of the interleaver blocks and being extracted at the timing of possibly being a second known signal according to the reference position, to determine an initial position of the interleaver blocks based on the position of the maximum value.

15. The method according to claim 14, wherein if the maximum value is not less than the second threshold value, the determining the length of interleaver blocks determines that the length of the interleaver blocks corresponds to a first interleaver length and determines from the position of the maximum value an initial position of interleaver blocks in the first interleaver length, and if the maximum value is less than the second threshold value, the determining the length of interleaver blocks determines that the length of the interleaver blocks corresponds to a second interleaver length greater than the first interleaver length and determines from the position of the maximum value an initial position of interleaver blocks in the second interleaver length.

16. The method according to claim 15, wherein the determining the length of interleaver blocks determines, if a length of the interleaver blocks corresponds to the second interleaver length, a position of the second known signal in the frame from the ratio of the maximum value to the first correlation values of known signals that is other than the second known signal at timing of possibly being the second known signal.

17. The method according to claim 14, wherein the determining the length of interleaver blocks selects correlation value samples, based on the reference position and according to a known signal period and a known signal interval that correspond to the mode, and processes the selected correlation value samples, the correlation value samples being obtained at timing of being possibly the second known signal, the known signal interval indicating a interval between adjacent known signals in a frame of the received signal, the known signal period indicating a period required for the same known signal to reappear in the frame.

18. The method according to claim 15, wherein the determining the length of interleaver blocks combines only fourth correlation values corresponding to sequences determined by the mode and by whether the length of the interleaver blocks corresponds to the first interleaver length or the second interleaver length, with regard to the third correlation values.

19. The method according to claim 14, wherein the determining the reference position generates the first correlation value sequence by combining the first correlation values based on the known signal period and the known signal interval corresponding to the mode, and if a plurality of second correlation values are generated, determines as the reference position a position of one of the second correlation values closest to an initial position of the receiving signal, at which signal receiving has started, the known signal interval indicating a interval between adjacent known signals in a frame of the received signal, the known signal period indicating a period required for the same known signal to reappear in the frame.

20. The method according to claim 14, wherein the calculating the one or more first correlation values selects, if the receiving signal is in first mode, a data block not having the same first sequences among the interleaver blocks as the second known signal, and if the receiving signal is in second mode higher in data rate than the first mode, selects two control signal blocks as the second known signal.

* * * * *